(12) United States Patent
Tsuda et al.

(10) Patent No.: US 12,428,012 B2
(45) Date of Patent: Sep. 30, 2025

(54) DISPLAY CONTROL DEVICE, DISPLAY CONTROL METHOD, AND NON-TRANSITORY COMPUTER-READABLE MEDIUM

(71) Applicant: TOYOTA JIDOSHA KABUSHIKI KAISHA, Toyota (JP)

(72) Inventors: Hideki Tsuda, Nagoya (JP); Toshinori Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 18/229,712

(22) Filed: Aug. 3, 2023

(65) Prior Publication Data

US 2024/0083449 A1 Mar. 14, 2024

(30) Foreign Application Priority Data

Sep. 14, 2022 (JP) ................................ 2022-146351

(51) Int. Cl.
*B60W 50/14* (2020.01)

(52) U.S. Cl.
CPC ....... *B60W 50/14* (2013.01); *B60W 2050/146* (2013.01); *B60W 2420/403* (2013.01); *B60W 2420/408* (2024.01); *B60W 2554/4041* (2020.02); *B60W 2556/20* (2020.02)

(58) Field of Classification Search
CPC ........ B60K 2360/177; B60K 2360/179; B60K 2360/48; B60K 35/23; B60W 2050/0006; B60W 2050/146; B60W 2420/403; B60W 2420/408; B60W 2554/4041; B60W 2554/802; B60W 2556/20; B60W 50/14
See application file for complete search history.

(56) References Cited

U.S. PATENT DOCUMENTS

| 11,338,821 | B2 * | 5/2022 | Ikeda | ..................... B60W 50/14 |
| 11,858,424 | B2 * | 1/2024 | Shin | ........................ H04N 5/268 |
| 12,145,050 | B2 * | 11/2024 | Iwasaki | ................. A63F 13/428 |
| 2006/0086022 | A1 * | 4/2006 | Would | ................... G06F 3/0482 40/584 |
| 2016/0147073 | A1 * | 5/2016 | Onda | ........................ B60R 1/24 345/7 |
| 2016/0216521 | A1 * | 7/2016 | Yachida | ............. G01C 21/3602 |
| 2019/0248287 | A1 | 8/2019 | Ono et al. | |
| 2020/0029011 | A1 | 1/2020 | Takahashi | |

(Continued)

FOREIGN PATENT DOCUMENTS

| DE | 112020002353 T5 * | 1/2022 | ............. B60K 35/60 |
| JP | 2010132056 A * | 6/2010 | |

(Continued)

*Primary Examiner* — Babar Sarwar
(74) *Attorney, Agent, or Firm* — Oliff PLC (57) ABSTRACT

A display control device configured to include a processor coupled to a memory, the processor calculating, based on sets of sensing information acquired from plural sensors that sense objects in front of a vehicle, a position of a detection object in front of the vehicle and, when displaying a position image representing the position of the detection object so as to overlay the position image on a foreground in a display area in front of a driver's seat, deciding whether or not to display the position image based on reliabilities of the sets of sensing information acquired from the plural sensors.

8 Claims, 11 Drawing Sheets

(56) References Cited

U.S. PATENT DOCUMENTS

| | | | |
|---|---|---|---|
| 2020/0079379 A1* | 3/2020 | Mimura | B60W 10/04 |
| 2020/0271449 A1 | 8/2020 | Sakano et al. | |
| 2020/0307594 A1* | 10/2020 | Kato | B60W 60/0059 |
| 2021/0223058 A1* | 7/2021 | Horihata | G01C 21/3635 |
| 2021/0402927 A1* | 12/2021 | Satomi | G06T 7/73 |
| 2022/0242236 A1* | 8/2022 | Eguchi | B60K 35/10 |
| 2024/0221246 A1* | 7/2024 | Shimazu | G06V 20/58 |

FOREIGN PATENT DOCUMENTS

| | | | | |
|---|---|---|---|---|
| JP | 2017-143417 A | | 8/2017 | |
| JP | 2019-138773 A | | 8/2019 | |
| JP | 2020-017807 A | | 1/2020 | |
| JP | 2020163942 A | * | 10/2020 | |
| JP | 2021-111034 A | | 8/2021 | |
| JP | 2022-079590 A | | 5/2022 | |
| JP | 7503239 B2 | * | 6/2024 | B60K 35/50 |
| WO | WO-2020230418 A1 | * | 11/2020 | B60K 35/60 |

* cited by examiner

DISPLAY CONTROL DEVICE, DISPLAY CONTROL METHOD, AND NON-TRANSITORY COMPUTER-READABLE MEDIUM

CROSS-REFERENCE TO RELATED APPLICATION

This application is based on and claims priority under 35 USC 119 from Japanese Patent Application No. 2022-146351 filed on Sep. 14, 2022, the disclosure of which is incorporated by reference herein.

BACKGROUND

Technical Field

The present disclosure relates to a display control device, a display control method, and a non-transitory computer-readable medium.

Related Art

Japanese Patent Application Laid-open (JP-A) No. 2020-163942 discloses a technology that, in accordance with sensing reliabilities of sensors (a position detection unit and a distance measurement unit), switches between superimposing and displaying, as a first image in a first projection area, a first image and a second image having mutually identical meanings and displaying, without superimposing, the first image and the second image as a second image in a second projection area.

In the case of using an augmented reality head-up display (AR-HUD) to display a position image representing the position of a detection object, the three-dimensional position of the detection object in front of a vehicle is calculated using sets of sensing information acquired from plural sensors. However, depending on the sensor type, installation position, and driving environment of the vehicle (e.g., rainy weather, nighttime), variations occur in the detection object sensing results in the plural sensors. Additionally, when the AR-HUD displays the position image, as shown also in FIG. 11 as an example, the display position of a position image 92 may be offset relative to a detection object 90. JP-A No. 2020-163942 discloses nothing about when variations occur in the detection object sensing results in the plural sensors.

SUMMARY

The present disclosure provides a display control device, a display control method, and a display control program that can inhibit a position image from being displayed in a position offset relative to a detection object.

A display control device pertaining to a first aspect includes a display control unit that calculates, based on sets of sensing information acquired from plural sensors that sense objects in front of a vehicle, a position of a detection object in front of the vehicle and, when displaying a position image representing the position of the detection object so as to overlay the position image on a foreground in a display area in front of a driver's seat, deciding whether or not to display the position image based on reliabilities of the sets of sensing information acquired from the plural sensors.

In the first aspect, the display control unit decides whether or not to display the position image representing the position of the detection object based on the reliabilities of the sets of sensing information acquired from the plural sensors. Because of this, for example, it becomes possible to not display the position image in a case where there are variations in the sets of sensing information (detection object sensing results) acquired from the plural sensors and to display the position image only in a case where the reliabilities of the sets of position information acquired from the plural sensors are high. Consequently, according to the first aspect, the position image can be inhibited from being displayed in a position offset relative to the detection object.

A second aspect is the first aspect, wherein the display control unit does not display the position image in a case in which there is a set of sensing information whose reliability is less than a predetermined value among the sets of sensing information acquired from the plural sensors.

In the second aspect, the display control unit does not display the position image in a case in which there is a set of sensing information whose reliability is less than a predetermined value among the sets of sensing information acquired from the plural sensors, so the position image can be displayed with a high degree accuracy by using only sets of sensing information whose reliability is equal to or higher than the predetermined value.

A third aspect is the first aspect, wherein the display control unit, in a case in which there is a set of sensing information whose reliability is less than a predetermined value among the sets of sensing information acquired from the plural sensors, calculates the position of the detection object based on sets of sensing information acquired from a sensor group of the plural sensors excluding a sensor corresponding to the set of sensing information whose reliability is less than the predetermined value.

In the third aspect, even in a case in which a set of sensing information whose reliability is less than the predetermined value is mixed in among the sets of sensing information acquired from the plural sensors, the position image can be accurately displayed by excluding the sensor corresponding to the set of sensing information whose reliability is less than the predetermined value.

A fourth aspect is the first aspect, wherein the display control unit acquires environment information relating to a driving environment of the vehicle and, based on the acquired environment information, calculates the reliabilities of the sets of sensing information acquired from the plural sensors.

According to the fourth aspect, the reliabilities of the sets of sensing information acquired from the plural sensors can be accurately calculated based on the environment information relating to the driving environment of the vehicle.

A fifth aspect is the first aspect, wherein the display control unit, in a case of not displaying the position image, displays, in a predetermined area, an object image schematically representing the detection object.

According to the fifth aspect, even in the case of not displaying the position image, by displaying the object image the occupant can be made aware of the fact that the display control device is detecting the detection object.

A sixth aspect is any of the first aspect to the fifth aspect, including a first ECU and a second ECU that cooperatively function as the display control unit, wherein: the first ECU receives the sets of sensing information from the plural sensors, calculates the reliabilities of the received sets of sensing information, calculates the position of the detection object from the received sets of sensing information, and sets a perception state resulting from each of the plural sensors from reliability calculation results, and the second ECU receives the position of the detection object and the perception state from the first ECU and, based on the received perception state, decides whether or not to display the position image.

The display control device is usually configured to include a first ECU that receives the sets of position information from the plural sensors, calculates the reliabilities of the received sets of position information, and calculates the position of the detection object and a second ECU that receives the sets of sensing information from the first ECU and displays the position image. The sixth aspect realizes the present disclosure by configuring the first ECU to set a perception state resulting from each of the plural sensors from the results of calculating the reliabilities of the received sets of sensing information and configuring the second ECU to receive the perception state from the first ECU and decide whether or not to display the position image based on the received perception state. Consequently, according to the sixth aspect, changes to configurations for realizing the present disclosure can be kept to a minimum.

A display control method pertaining to a seventh aspect allows a computer to execute a process including calculating, based on sets of sensing information acquired from plural sensors that sense objects in front of a vehicle, a position of a detection object in front of the vehicle and, when displaying a position image representing the position of the detection object so as to overlay the position image on a foreground in a display area in front of a driver's seat, deciding whether or not to display the position image based on reliabilities of the sets of sensing information acquired from the plural sensors.

According to the seventh aspect, as in the first aspect, the position image can be inhibited from being displayed in a position offset relative to the detection object.

A display control program pertaining to an eighth aspect causes a computer to execute a process including calculating, based on sets of sensing information acquired from plural sensors that sense objects in front of a vehicle, a position of a detection object in front of the vehicle and, when displaying a position image representing the position of the detection object so as to overlay the position image on a foreground in a display area in front of a driver's seat, deciding whether or not to display the position image based on reliabilities of the sets of sensing information acquired from the plural sensors.

According to the eighth aspect, as in the first aspect, the position image can be inhibited from being displayed in a position offset relative to the detection object.

The present disclosure has the advantageous effect that the position image can be inhibited from being displayed in a position offset relative to the detection object.

BRIEF DESCRIPTION OF THE DRAWINGS

Exemplary embodiments of the present disclosure will be described in detail based on the following figures, wherein.

DETAILED DESCRIPTION

Examples of embodiments of the present disclosure will now be described in detail below with reference to the drawings.

First Embodiment

Figure 1:
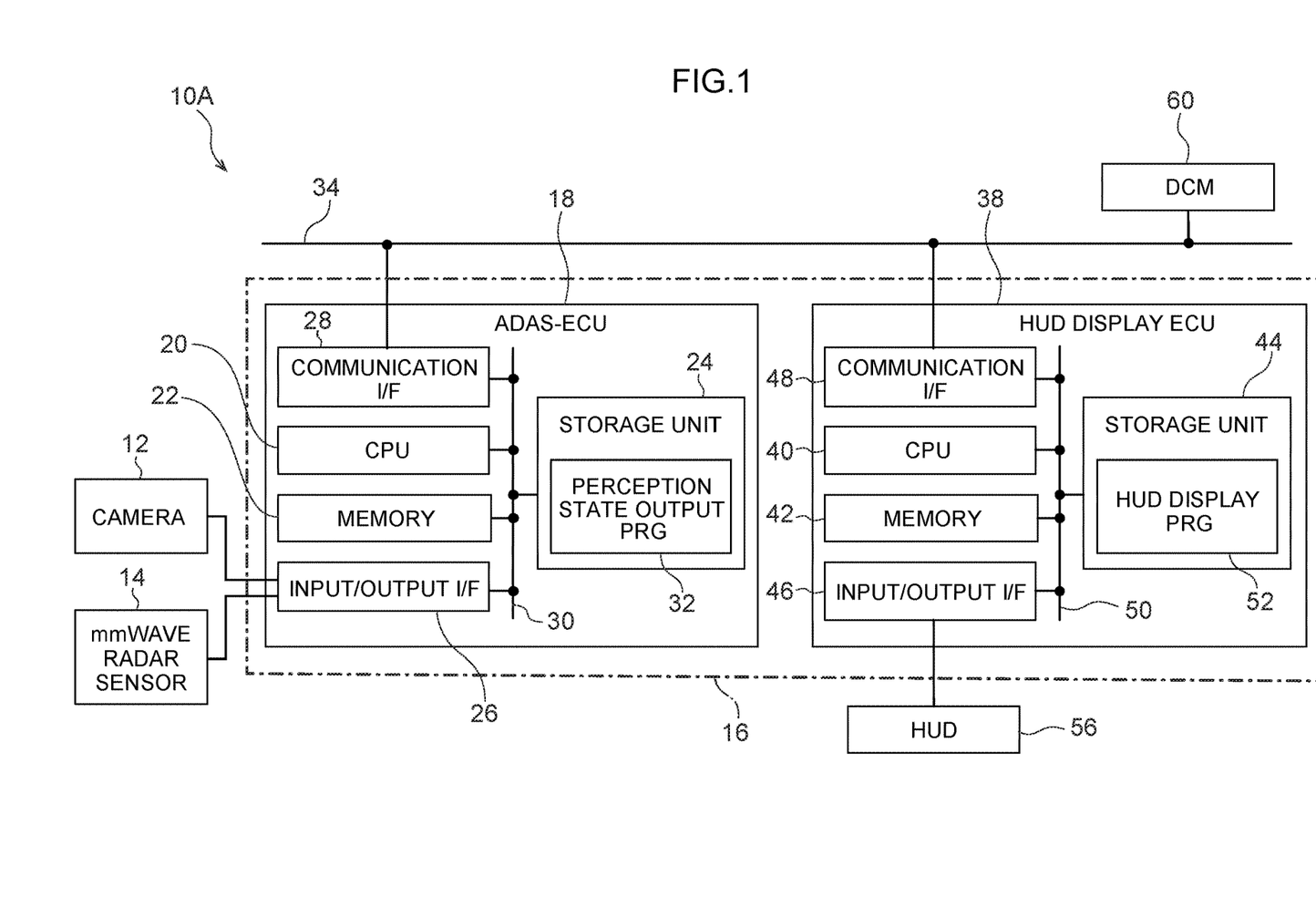
FIG. 1 is a block diagram showing the schematic configuration of an in-vehicle system pertaining to a first embodiment.

An in-vehicle system 10A shown in FIG. 1 includes a camera 12, a mmWave radar sensor 14, an ADAS-ECU 18, a head-up display (HUD) display ECU 38, a HUD 56, and a data communication module (DCM) 60. The camera 12 and the mmWave radar sensor 14 are connected to the ADAS-ECU 18, and the HUD 56 is connected to the HUD display ECU 38. The ADAS-ECU 18, the HUD display ECU 38, and the DCM 60 are connected to a system bus 34 and are communicable with each other. Furthermore, the ADAS-ECU 18 and the HUD display ECU 38 configure a display control device 16. The display control device 16 is an example of a display control device in the present disclosure.

Figure 2:
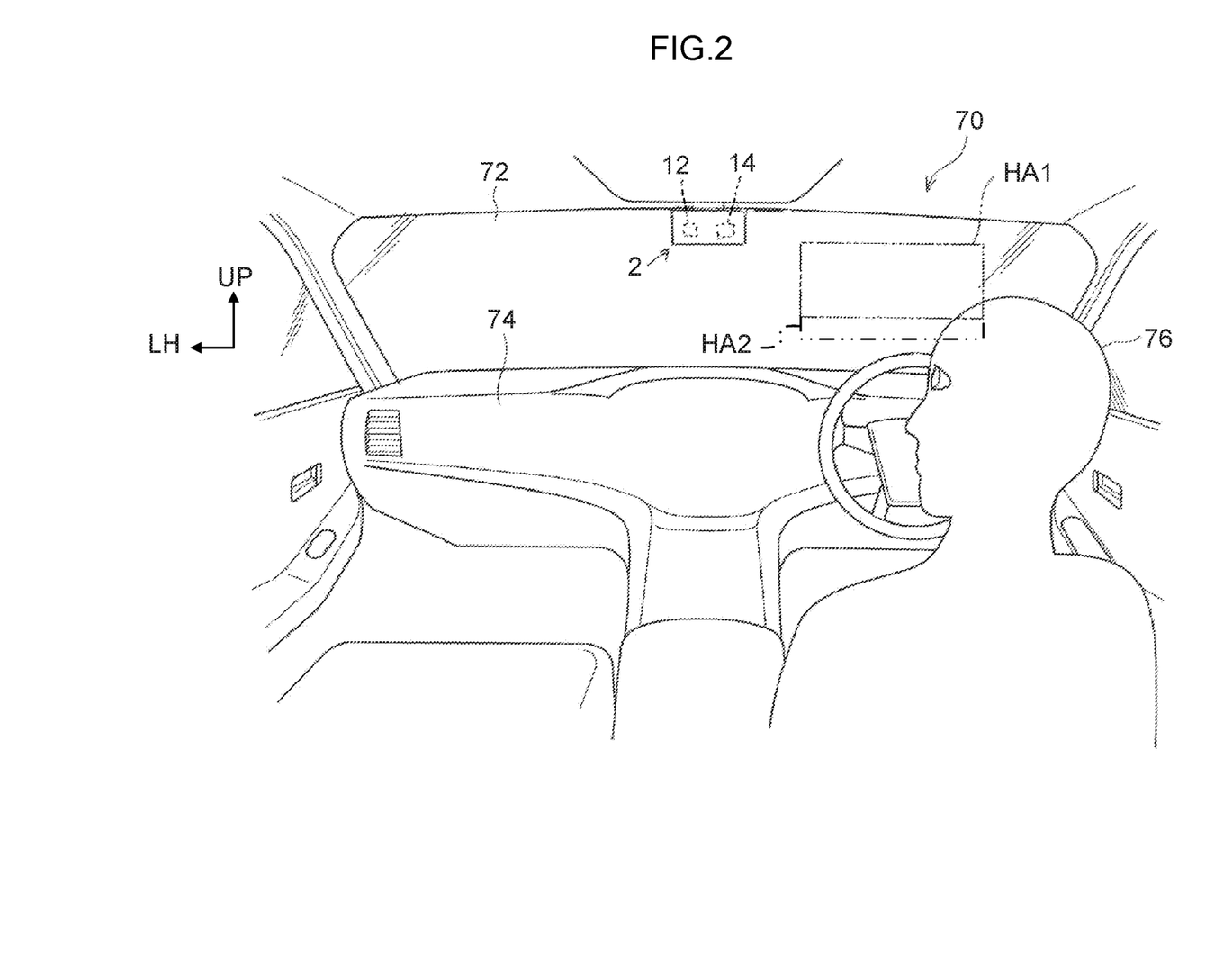
FIG. 2 is a perspective view showing a cabin of a vehicle.

As shown in FIG. 2, a vehicle 70 in which the in-vehicle system 10A is installed includes a front windshield 72 and an instrument panel 74. On the upper portion of the cabin-side surface of the front windshield 72 is provided a sensor unit 2, and the sensor unit 2 is provided with the camera 12 and the mmWave radar sensor 14.

The camera 12 captures images of objects further in front of the vehicle 70 than itself and outputs the imaging results (an example of sensing information). The mmWave radar sensor 14 measures distances to objects in front of the vehicle 70 by transmitting probing waves in the forward direction of the vehicle 70 and receiving reflected waves, and outputs the distance measurement results (an example of sensing information). In the first embodiment, the camera 12 and the mmWave radar sensor 14 are an example of plural sensors in the present disclosure.

The ADAS-ECU 18 includes a central processing unit (CPU) 20, a memory 22 such as a read-only memory (ROM) or a random-access memory (RAM), and a nonvolatile storage unit 24 such as a hard disk drive (HDD) or a solid-state drive (SSD). The ADAS-ECU 18 also includes an input/output interface (I/F) unit 26 and a communication interface (I/F) unit 28. The camera 12 and the mmWave radar sensor 14 are connected to the input/output interface unit 26, and the system bus 34 is connected to the communication interface unit 28. The CPU 20, the memory 22, the storage unit 24, the input/output interface unit 26, and the communication interface unit 28 are connected to an internal bus 30 and are communicable with each other.

Figure 3:
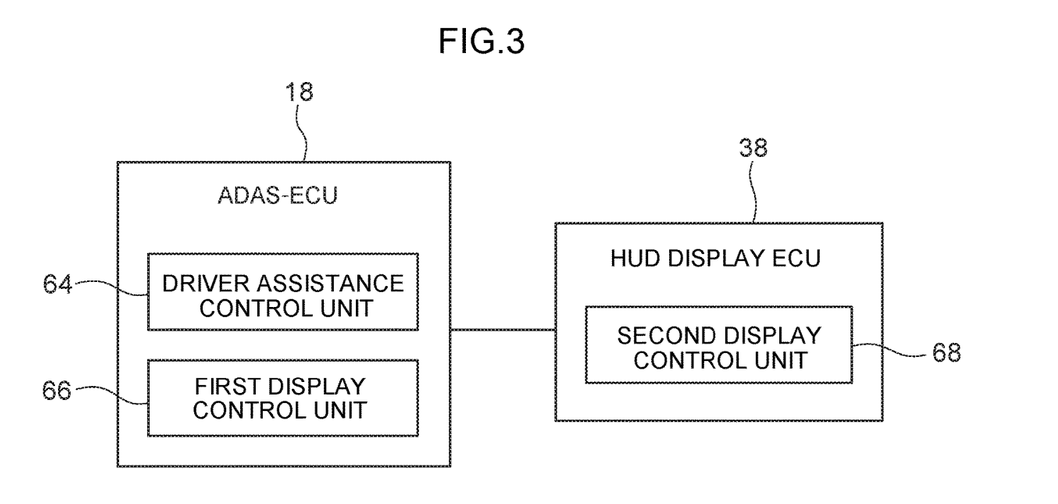
FIG. 3 is a functional block diagram of a display control device.

Although the drawings do not show this, the storage unit 24 of the ADAS-ECU 18 stores a program for causing the ADAS-ECU 18 to function as a driver assistance control unit 64 (see FIG. 3). The driver assistance control unit 64 executes driver assistance control corresponding to driving levels 1 to 5 defined by the Society of Automotive Engineers (SAE) as a result of a predetermined switch (not shown in the drawings) being operated by an occupant 76 (see FIG. 2). For example, the driver assistance control unit 74 can execute, as driver assistance control, adaptive cruise control (ACC), lane change assist control, and lane departure alert control, for example.

The storage unit 24 of the ADAS-ECU 18 also stores a perception state output program 32. The ADAS-ECU 18 functions as a first display control unit 66 shown in FIG. 3 and performs a later-described perception state output process (FIG. 4) as a result of the perception state output program 32 being read from the storage unit 24 and loaded to the memory 22 and the perception state output program that has been loaded to the memory 22 being executed by the CPU 20. The ADAS-ECU 18 is an example of a first ECU in the present disclosure.

The HUD display ECU 38 includes a CPU 40, a memory 42 such as a ROM or RAM, a nonvolatile storage unit 44 such as an HDD or SSD, an input/output interface (I/F) unit 46, and a communication interface (I/F) unit 48. The CPU 40, the memory 42, the storage unit 44, the input/output interface unit 46, and the communication interface unit 48 are connected to an internal bus 50 and are communicable with each other. Furthermore, the HUD 56 is connected to the input/output interface unit 46, and the system bus 34 is connected to the communication interface unit 48.

The storage unit 44 of the HUD display ECU 38 stores a HUD display program 52. The HUD display ECU 38 functions as a second display control unit 68 shown in FIG. 3 and performs a later-described HUD display process (FIG. 5) as a result of the HUD display program 52 being read from the storage unit 44 and loaded to the memory 42 and the HUD display program 52 that has been loaded to the memory 42 being executed by the CPU 40.

The second display control unit 68 cooperates with the first display control unit 66 to function as a display control unit in the present disclosure. That is, the first display control unit 66 and the second display control unit 68 calculate, based on sets of sensing information acquired from the camera 12 and the mmWave radar sensor 14 that sense objects in front of the vehicle 70, the position of a detection object in front of the vehicle 70 and, when displaying a position image representing the position of the detection object so as to overlay the position image on a foreground in a display area (an AR display area HA1 shown in FIG. 2) in front of a driver' seat, decide whether or not to display the position image based on reliabilities of the sets of sensing information acquired from the camera 12 and the mmWave radar sensor 14.

The HUD display program 52 stored in the storage unit 44 of the HUD display ECU 38 is, together with the perception state output program 32 stored in the storage unit 24 of the ADAS-ECU 18, an example of a display control program pertaining to the present disclosure. Furthermore, the HUD display ECU 38 is an example of a second ECU in the present disclosure.

In the present embodiment, the display area of the HUD 56 is, as shown in FIG. 2, divided into a first display area HA1 for displaying images using AR and a second display area HA2 that is adjacent to the vehicle lower side of the first display area HA1 and is for displaying images not using AR. Furthermore, in the present embodiment, the storage unit 44 of the HUD display ECU 38 stores data of projections such as various characters and icons (figures). The icons include a position image 82 (see FIG. 6), which represents the position of a preceding vehicle in front of the vehicle 70 and is for display in the first display area HA1 and a preceding vehicle schematic image 84 (see FIG. 7), which schematically represents the preceding vehicle and is for display in the second display area HA2.

Figure 6:
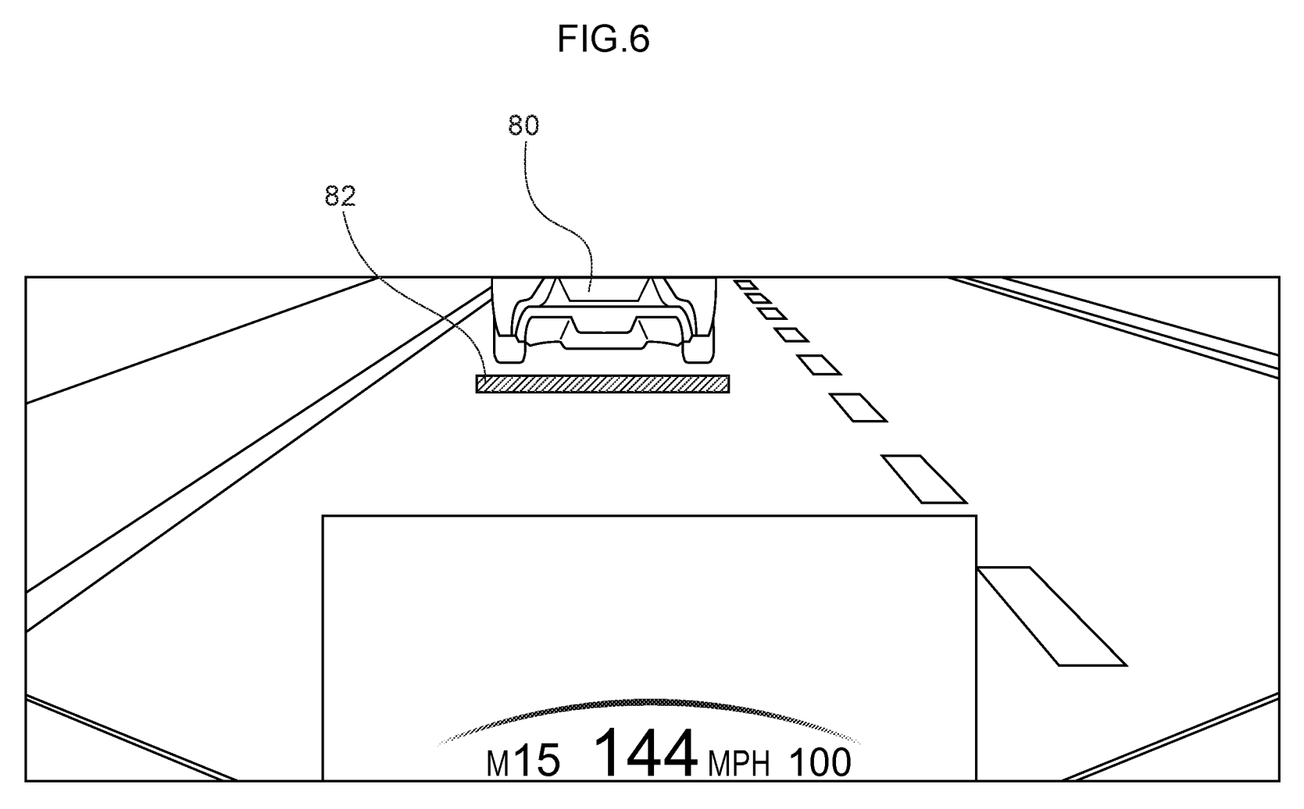
FIG. 6 is a conceptual image showing a state in which a position image is displayed in a first display area of a HUD.

The second display control unit 68, in the case of displaying a projection such as the position image 82 in the first display area HA1 computes, from three-dimensional position information of the object corresponding to the projection to be displayed (if the position image 82, the preceding vehicle), display position information of the projection for displaying the projection in a position according to the object in the first display area HA1. Then, the second display control unit 68 outputs the computed display position information, together with the data of the projection to be displayed, to the HUD 56. In this case, the HUD 56 projects and displays (displays using AR) the projection such as the position image 82 in a position in the first display area HA1 according to the three-dimensional position information of the corresponding object. In this way, the HUD 56 functions as an AR-HUD in the first display area HA1.

Figure 7:
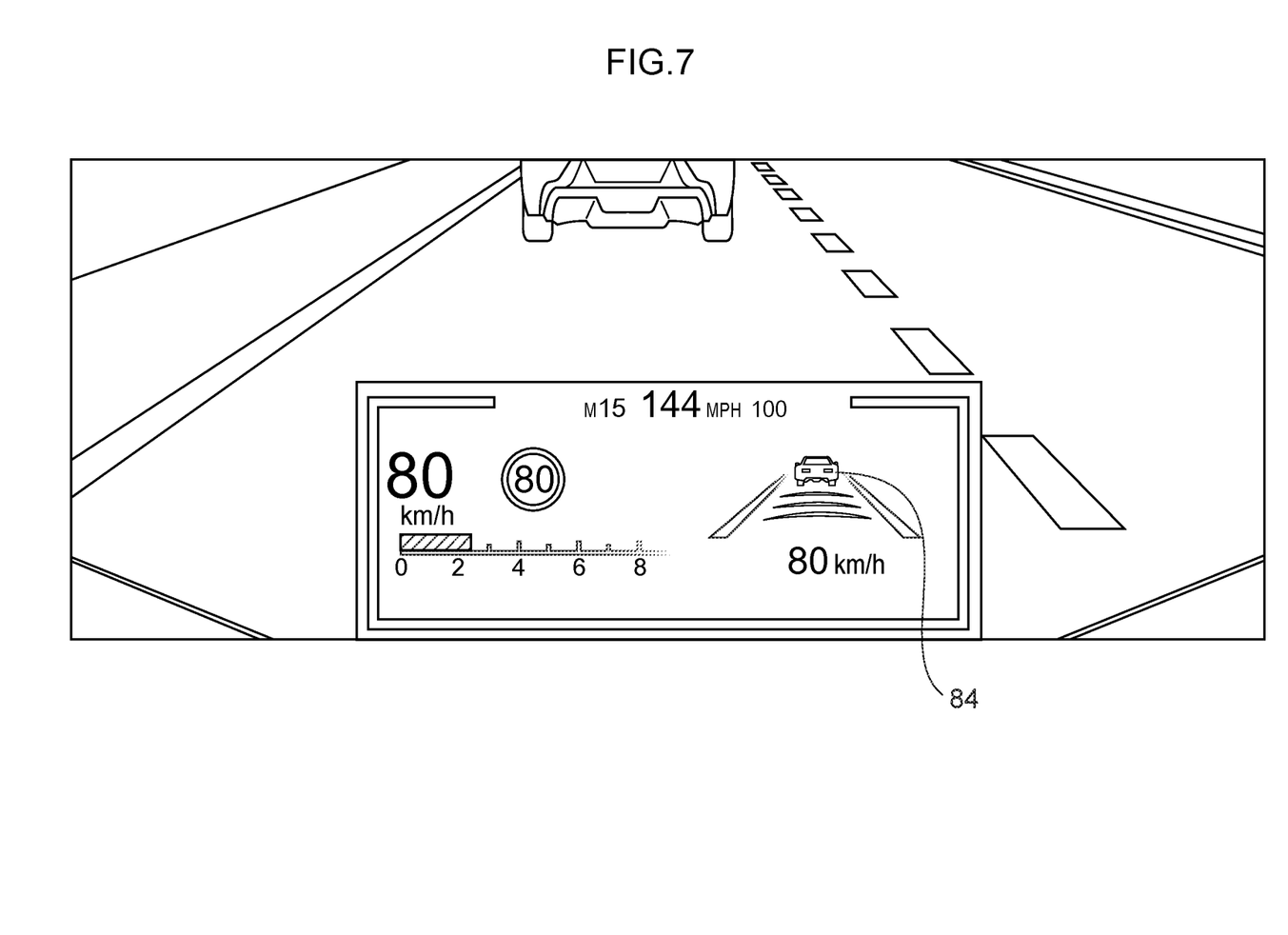
FIG. 7 is a conceptual image showing a state in which a preceding vehicle schematic image is displayed in a second display area of the HUD.

Furthermore, the second display control unit 68, in the case of displaying a projection such as the preceding vehicle schematic image 84 in the second display area HA2, computes two-dimensional display position information for displaying the projection in the second display area HA2 and outputs the computed display position information, together with the data of the projection to be displayed, to the HUD 56. In this case, the HUD 56 projects and displays (displays not using AR) the projection in a display position in the second display area HA2.

The HUD 56 includes a projection device, and the projection device projects, in the forward direction of the vehicle 70 in accordance with the position information input from the second display control unit 68, the image represented by the projection data input from the second display control unit 68. The image projected by the projection device is reflected upward by a reflection unit (not shown in the drawings) provided in the vehicle 70 and is then reflected rearward by the rear surface of the front windshield 72. The image reflected forward by the reflection unit is formed as a virtual image in the display area HA positioned in front of the front windshield 72.

Figure 4:
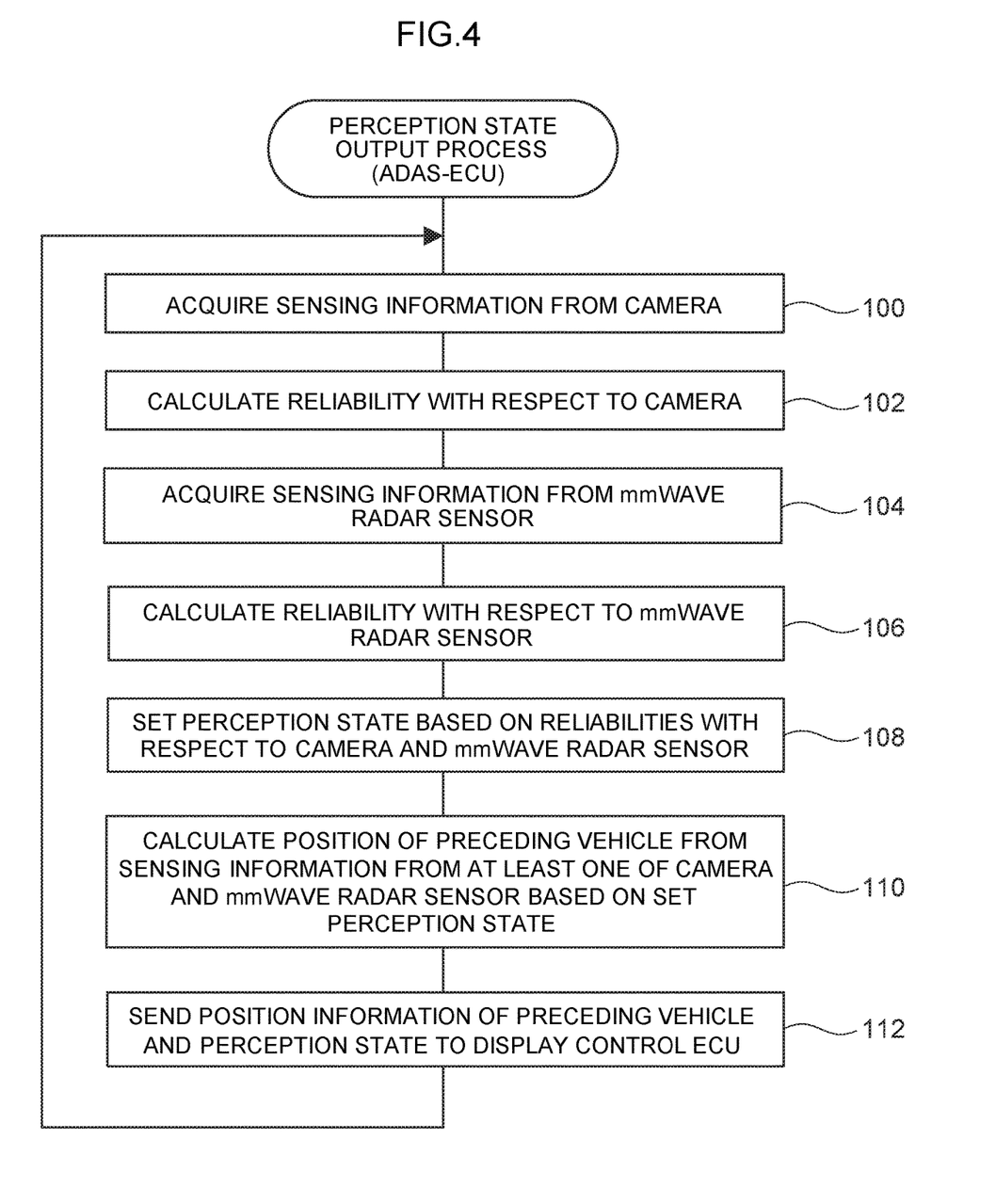
FIG. 4 is a flowchart showing a perception state output process executed by an ADAS-ECU in the first embodiment.

Next, as the action of the first embodiment, the perception state output process executed by the ADAS-ECU 18 will first be described with reference to FIG. 4. In step 100 of the perception state output process, the first display control unit 66 acquires from the camera 12 the results of the imaging in front of the vehicle 70 by the camera 12 (a set of sensing information).

In step 102, the first display control unit 66 calculates a reliability with respect to the set of sensing information acquired from the camera 12. For example, if features such as sharpness of the set of sensing information acquired from the camera 12 are low, the accuracy of the position information of the preceding vehicle also becomes low if the position information is calculated from the set of sensing information acquired from the camera 12. For this reason, as the reliability with respect to the set of sensing information acquired from the camera 12, as an example, the first display control unit 66 can calculate features such as sharpness from the sensing information and use the calculated features as the reliability.

Furthermore, in a case where there is a low amount of natural light, such as, for example, when it is nighttime or when the vehicle 70 is driving through a tunnel, the accuracy of the position information of the preceding vehicle also becomes low if the position information is calculated from the set of sensing information acquired from the camera 12. For this reason, for example, the first display control unit 66 may be configured to acquire, via the DCM 60 from a server (not shown in the drawings), environment information relating to the driving environment of the vehicle 70, including information about whether or not the vehicle 70 is driving through a tunnel, and calculate the reliability based on the acquired environment information and time information.

In step 104, the first display control unit 66 acquires from the mmWave radar sensor 14 the results of the distance measurement in front of the vehicle 70 by the mmWave radar sensor 14 (a set of sensing information). In step 106, the first display control unit 66 calculates, in the same way as in the previous step 102, the reliability with respect to the set of sensing information acquired from the mmWave radar sensor 14. For example, in a case where the weather is rainy, the state of the reflected waves becomes abnormal, so the accuracy of the position information of the preceding vehicle also becomes low if the position information is calculated from the set of sensing information acquired from the mmWave radar sensor 14. For this reason, for example, the first display control unit 66 may be configured to acquire, via the DCM 60 from a server (not shown in the drawings), environment information relating to the driving environment of the vehicle 70, including information about weather conditions in the area where the vehicle 70 is driving, and calculate the reliability based on the acquired environment information.

In step 108, the first display control unit 66 sets, based on the reliability with respect to the set of sensing information acquired from the camera 12 and the reliability with respect to the set of sensing information acquired from the mmWave radar sensor 14, a "perception state" by which the preceding vehicle is perceived by each of the camera 12 and the mmWave radar sensor 14. For example, in a case where the reliability with respect to the set of sensing information acquired from the camera 12 is equal to or higher than a predetermined value and the reliability with respect to the set of sensing information acquired from the mmWave radar sensor 14 is less than a predetermined value, the first display control unit 66 sets "camera by itself" for the "perception state." Furthermore, for example, in a case where the reliability with respect to the set of sensing information acquired from the camera 12 is less than a predetermined value and the reliability with respect to the set of sensing information acquired from the mmWave radar sensor 14 is equal to or higher than a predetermined value, the first display control unit 66 sets "mmWave radar sensor by itself" for the "perception state." Moreover, for example, in a case where the reliability with respect to the set of sensing information acquired from the camera 12 and the reliability with respect to the set of sensing information acquired from the mmWave radar sensor 14 are each equal to or higher than a predetermined value, the first display control unit 66 sets "camera+mmWave radar sensor" for the "perception state."

In step 110, the first display control unit 66 calculates, based on the "perception state" set in step 108, position information representing the three-dimensional position of the preceding vehicle from the set(s) of sensing information acquired from at least one of the camera 12 and the mmWave radar sensor 14. That is, in a case where the "perception state" is "camera by itself," the first display control unit 66 calculates the position information based on the set of sensing information acquired from the camera 12. Furthermore, in a case where the "perception state" is "mmWave radar sensor by itself," the first display control unit 66 calculates the position information based on the set of sensing information acquired from the mmWave radar sensor 14. Additionally, in a case where the "perception state" is "camera+mmWave radar sensor," the first display control unit 66 calculates the position information based on the set of sensing information acquired from the camera 12 and the set of sensing information acquired from the mmWave radar sensor 14.

In step 112, the first display control unit 66 sends to the HUD display ECU 38 the position information of the preceding vehicle calculated in step 110 and the "perception state" set in step 108. When the first display control unit 66 performs the process of step 112, it returns to step 100 and repeats the processes from step 100 on.

Figure 5:
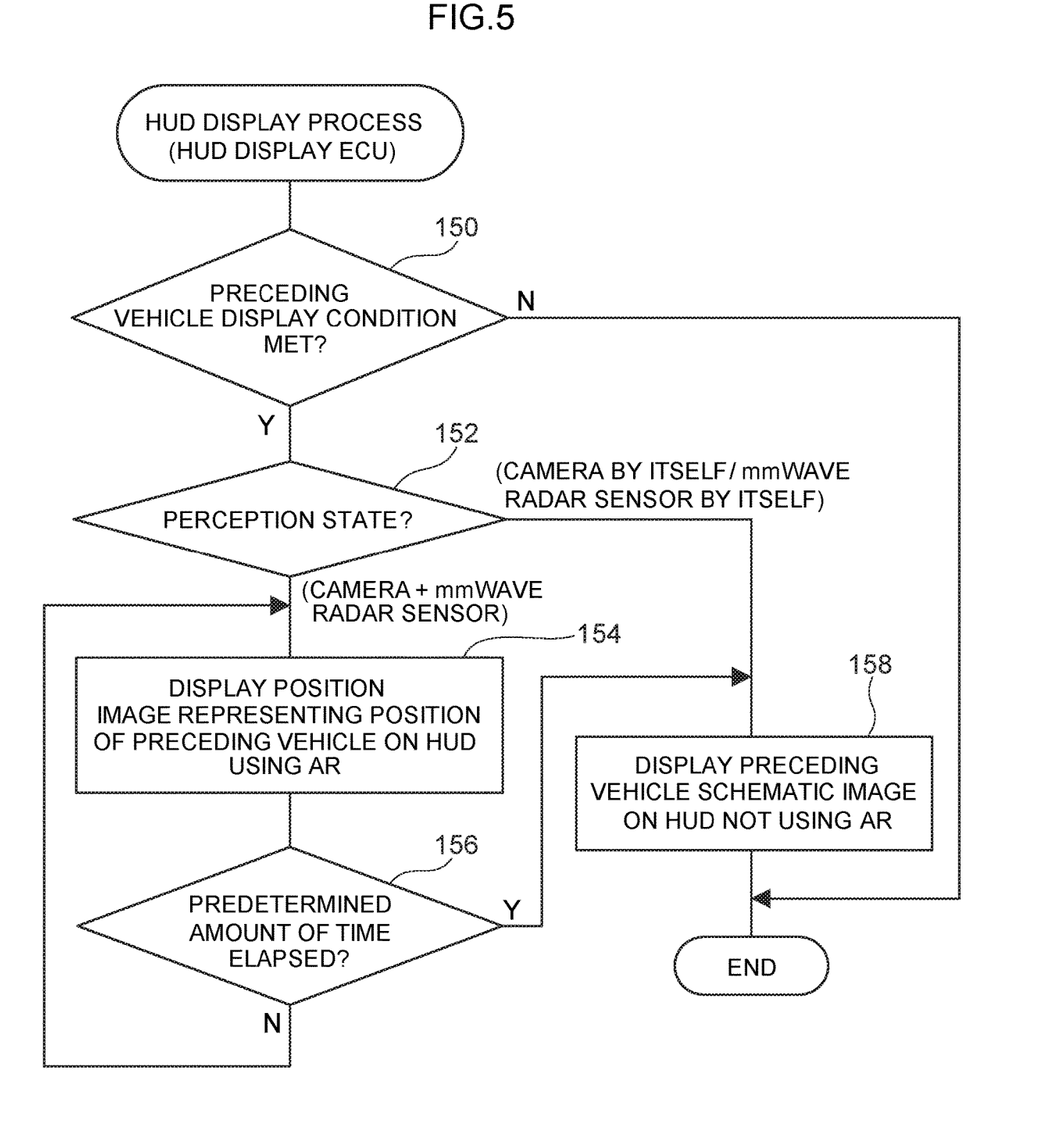
FIG. 5 is a flowchart showing a HUD display process executed by a HUD display ECU in the first embodiment.

Next, the HUD display process executed by the HUD display ECU 38 will be described with reference to FIG. 5. In step 150 of the HUD display process, the second display control unit 68 determines whether or not a preset preceding vehicle display condition is met. The preceding vehicle display condition is a condition wherein the HUD 56 displays the position image 82 or the preceding vehicle schematic image 84, and examples thereof include a case where the preceding vehicle has come within a predetermined distance of the vehicle 70 or a case where the preceding vehicle has changed due to a vehicle from an adjacent lane cutting in. In a case where the determination of step 150 is NO, the second display control unit 68 ends the HUD display process.

In a case where the preceding vehicle display condition is met, the determination of step 150 becomes YES and the second display control unit 68 moves to step 152. In step 152, the second display control unit 68 determines the "perception state" received from the ADAS-ECU 18 and moves to either step 154 or step 158 in accordance with the "perception state."

For example, in a case where the "perception state" is "camera+mmWave radar sensor," the position information of the preceding vehicle received from the ADAS-ECU 18 can be judged to have a high calculation accuracy, so the second display control unit 68 moves from step 152 to step 154. In step 154, the second display control unit 68 computes, from the three-dimensional position information of the preceding vehicle, display position information of the position image 82 for displaying the position image 82 in a position according to the preceding vehicle in the first display area HA1. Then, the second display control unit 68 outputs the computed display position information, together with the data of the position image 82 to be displayed, to the HUD 56. Consequently, as shown in FIG. 6, the HUD 56 projects and displays (displays using AR) the position image 82 in a position in the first display area HA1 according to the three-dimensional position information of the preceding vehicle 80.

Figure 11:
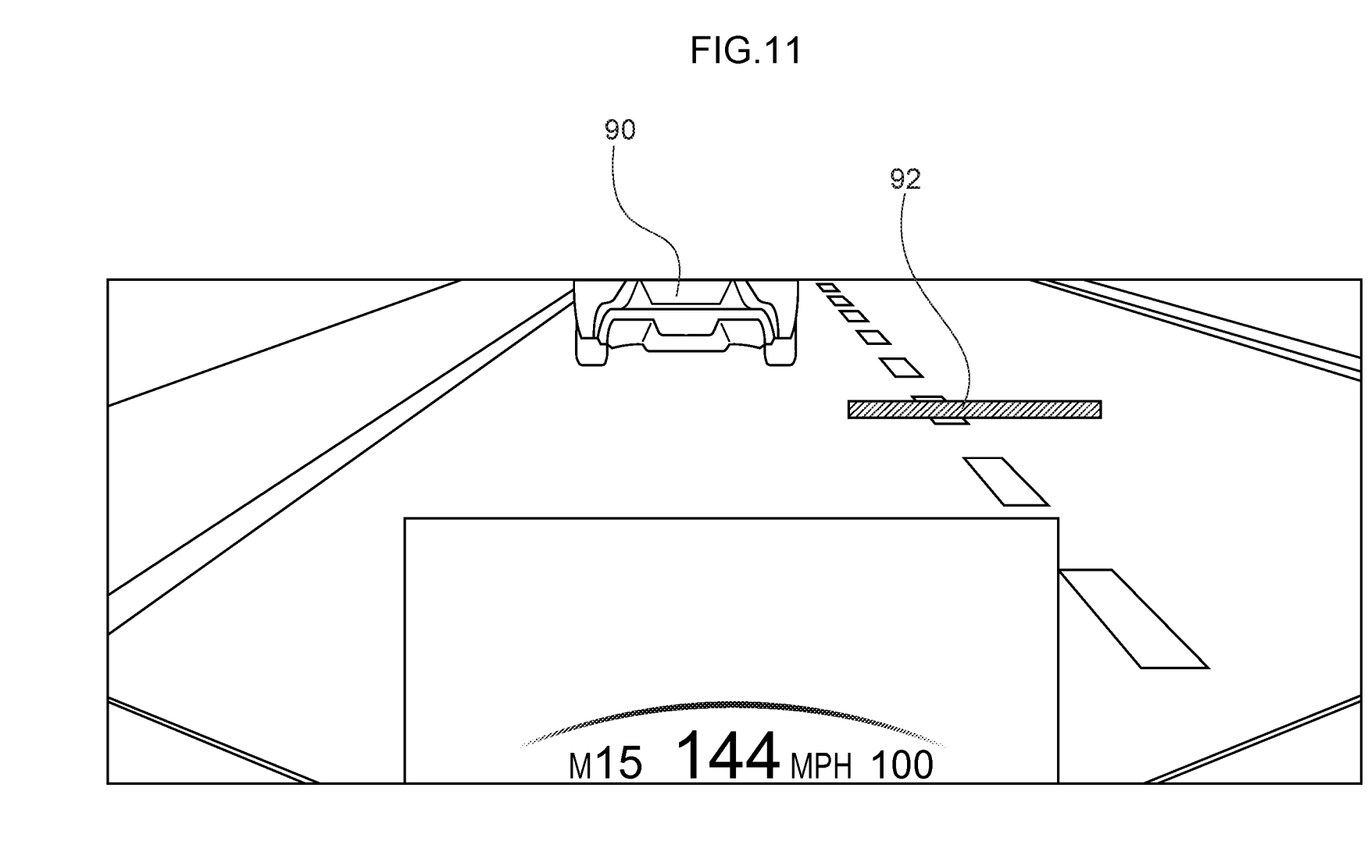
FIG. 11 is a conceptual image showing a state in which the display position of a position image is offset relative to a detection object in the prior art.

In a case where the "perception state" is "camera by itself" or "mmWave radar sensor by itself," the position information of the preceding vehicle received from the ADAS-ECU 18 can be judged to be lacking in calculation accuracy, so the second display control unit 68 moves from step 152 to step 158. In step 158, the second display control unit 68 computes two-dimensional position information for displaying in the second display area HA2 the preceding vehicle schematic image schematically representing the preceding vehicle and outputs the computed display position information, together with the data of the preceding vehicle schematic image 84, to the HUD 56. Consequently, as shown in FIG. 7, the HUD 56 projects and displays (displays not using AR) the preceding vehicle schematic image 84 in a display position in the second display area HA2. Because of this, in a case where the position information of the preceding vehicle received from the ADAS-ECU 18 is lacking in calculation accuracy, the position image is inhibited from being displayed in a position offset from the preceding vehicle as shown in FIG. 11 as an example. The preceding vehicle schematic image is an example of an object image in the present disclosure and the second display area HA2 is an example of a predetermined area in the present disclosure.

In a case where the second display control unit 68 displays the position image 82 using AR in step 154, in the next step 156 it determines whether or not a predetermined amount of time (e.g., about several seconds of time) has elapsed since displaying the position image 82 using AR. In a case where the determination of step 156 is NO, the second display control unit 68 returns to step 154 and continues the AR display of the position image 82. In a case where the determination of step 156 is YES, the second display control unit 68 moves to step 158 and, instead of the AR display of the position image 82, moves to the non-AR display of the preceding vehicle schematic image 84.

In this way, in the first embodiment, the first display control unit 66 and the second display control unit 68 calculate, based on the sets of sensing information acquired from the plural sensors (the camera 12 and the mmWave radar sensor 14) that sense objects in front of the vehicle 70, the position of the preceding vehicle in front of the vehicle and, when displaying the position image 82 representing the position of the preceding vehicle so as to overlay the position image 82 on the foreground in the first display area HA1 in front of the driver's seat, decide whether or not to display the position image 82 based on the reliabilities of the sets of sensing information acquired from the plural sensors. Because of this, the position image 82 can be inhibited from being displayed in a position offset relative to the preceding vehicle.

Furthermore, in the first embodiment, the first display control unit 66 and the second display control unit 68 do not display the position image 82 in a case where there is a set of sensing information whose reliability is less than a predetermined value among the sets of sensing information acquired from the plural sensors (the camera 12 and the mmWave radar sensor 14). Because of this, by using just the sensing information whose reliability is equal to or higher than the predetermined value, the position image 82 can be displayed with a high degree of accuracy.

Furthermore, in the first embodiment, the first display control unit 66 and the second display control unit 68 acquire environment information relating to the driving environment of the vehicle 70 and, based on the acquired environment information, calculate the reliabilities of the sets of sensing information acquired from the plural sensors (the camera 12 and the mmWave radar sensor 14). Because of this, the reliabilities of the sets of sensing information acquired from the plural sensors can be accurately calculated based on the environment information relating to the driving environment of the vehicle 70.

Moreover, in the first embodiment, the first display control unit 66 and the second display control unit 68, in the case of not displaying the position image 82, display in the second display area HA2 the preceding vehicle schematic image 84 schematically representing the preceding vehicle. Because of this, the occupant 76 can be made aware of the fact that the display control device 16 is detecting the preceding vehicle.

Furthermore, in the first embodiment, the display control device 16 includes the ADAS-ECU 18 and the HUD display ECU 38. The ADAS-ECU 18 receives the sets of sensing information from the plural sensors (the camera 12 and the mmWave sensor 14), calculates the reliabilities of the received sets of sensing information, calculates the three-dimensional position of the preceding vehicle from the received sets of sensing information, and sets the perception state resulting from each of the plural sensors from reliability calculation results. Additionally, the HUD display ECU 38 receives the position information and the perception state from the ADAS-ECU 18 and, based on the received perception state, decides whether or not to display the position image. Because of this, changes to the configurations of the ADAS-ECU 18 and the HUD display ECU 38 for realizing the present disclosure can be kept to a minimum.

Second Embodiment

Next, a second embodiment of the present disclosure will be described. Parts in the second embodiment that are identical to those in the first embodiment are assigned identical reference signs and description thereof will be omitted.

Figure 8:
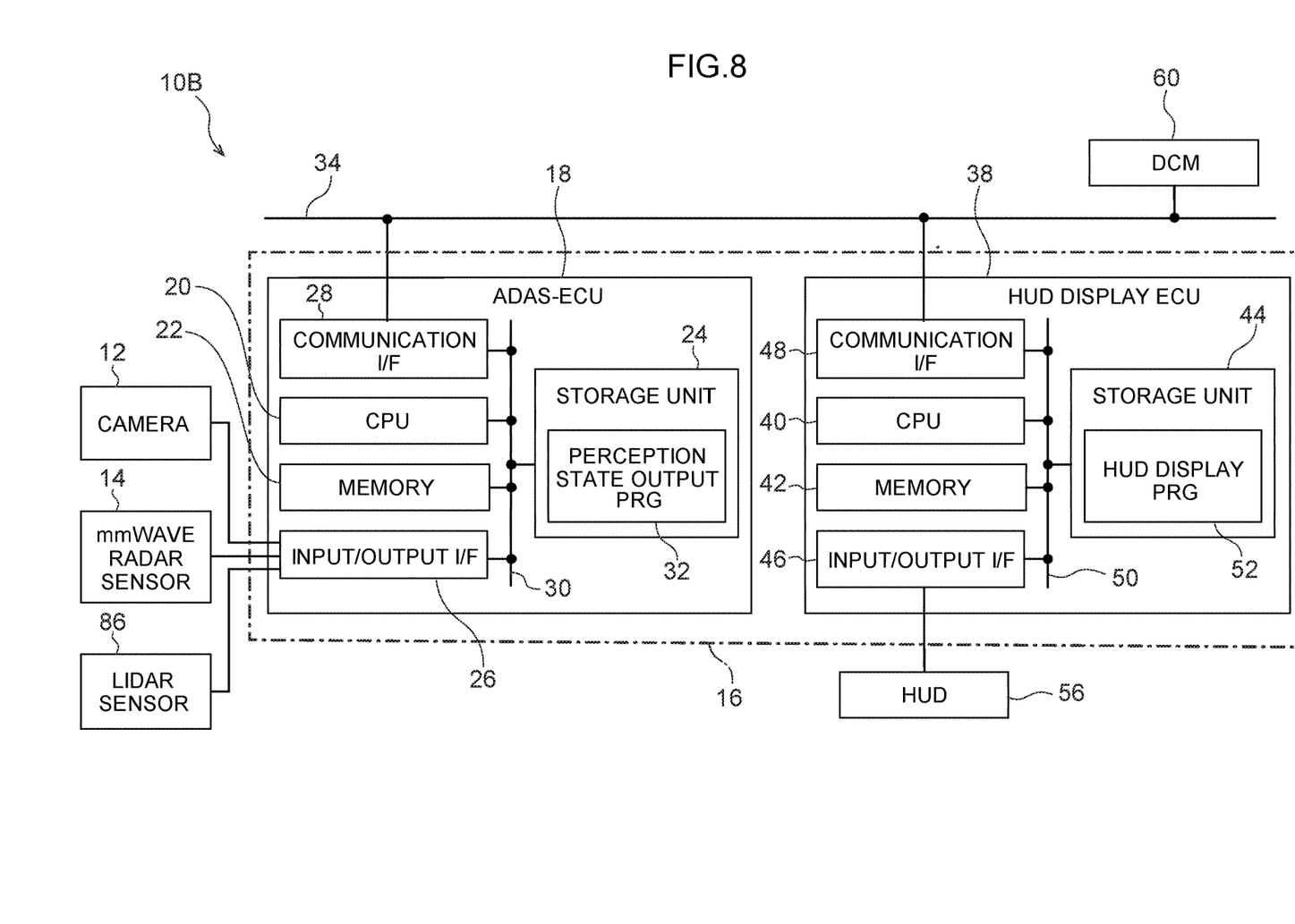
FIG. 8 is a block diagram showing the schematic configuration of an in-vehicle system pertaining to a second embodiment.

FIG. 8 shows an in-vehicle system 10B pertaining to the second embodiment. In the in-vehicle system 10B, as an example of a sensor in the present disclosure, a lidar (light detection and ranging, or laser imaging detection and ranging) sensor 86 that uses laser light to detect the distance to and direction of objects in front of the vehicle 70 is additionally installed. The lidar sensor 86 is connected to the input/output interface unit 26 of the ADAS-ECU 18.

Figure 9:
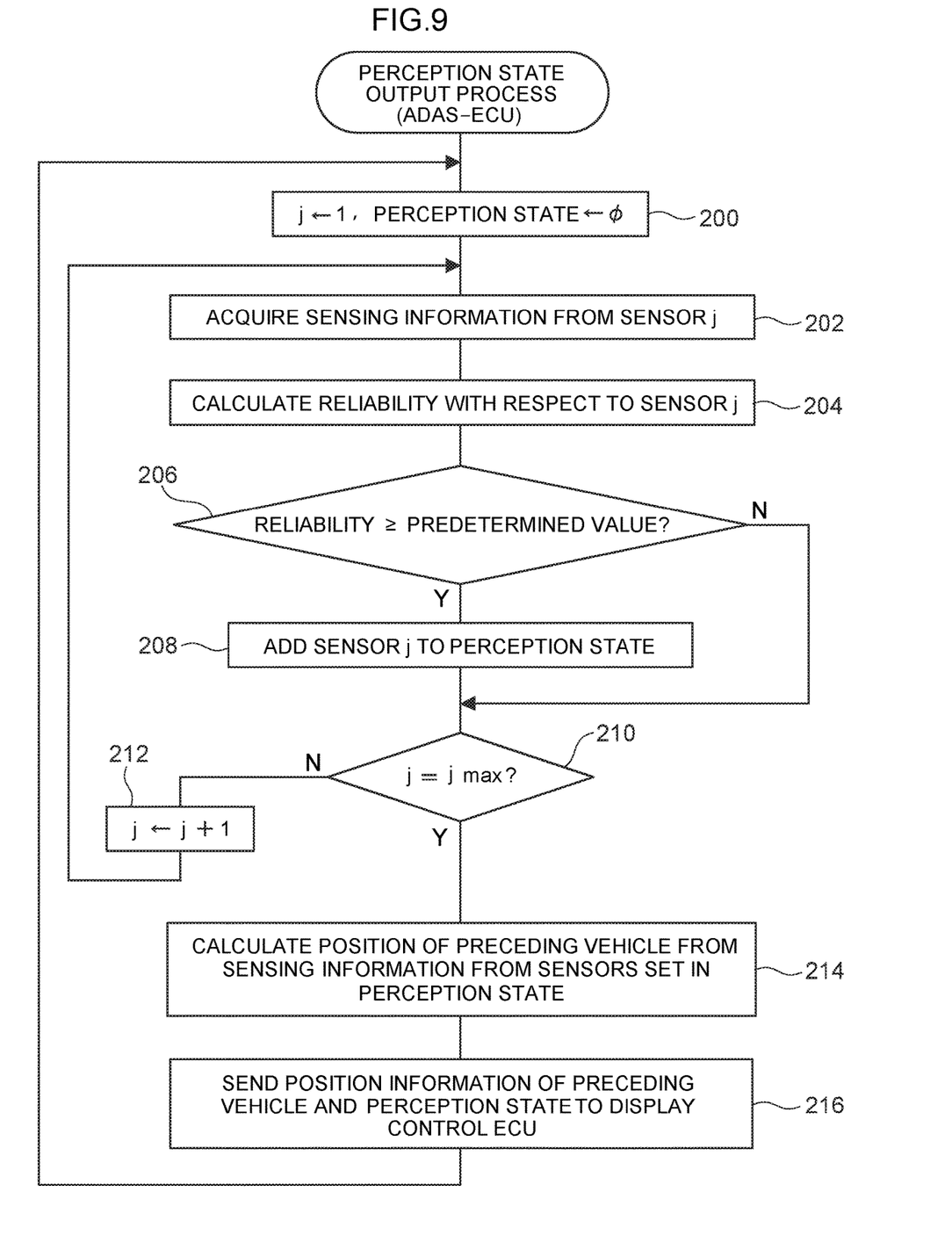
FIG. 9 is a flowchart showing the perception state output process executed by the ADAS-ECU in the second embodiment.

Next, as the action of the second embodiment, first, the perception state output process executed by the ADAS-ECU 18 pertaining to the second embodiment will be described with reference to FIG. 9. In step 200 of the perception state output process, the first display control unit 66 sets a variable j for identifying the individual sensors to 1 and sets to empty (sets an empty set φ) the "perception state" for setting information of sensors whose reliability with respect to the sensing information is equal to or higher than a predetermined value.

In step 202, the first display control unit 66 acquires the set of sensing information from the j-th sensor (any of the camera 12, the mmWave radar sensor 14, and the lidar sensor 86). Furthermore, in step 204, the first display control unit 66 calculates, in the same way as in steps 102 and 106 described in the first embodiment, the reliability with respect to the set of sensing information acquired from the j-th sensor.

In the next step 206, the first display control unit 66 determines whether or not the reliability with respect to the set of sensing information from the j-th sensor calculated in step 204 is equal to or higher than a predetermined value. In a case where the determination of step 206 is YES, the first display control unit 66 moves to step 208. Then, in step 208, the first display control unit 66 adds the information of the j-th sensor to the "perception state" and moves to step 210. In a case where the reliability with respect to the set of sensing information from the j-th sensor is less than the predetermined value, the first display control unit 66 skips step 208 and moves to step 210.

In step 210, the first display control unit 66 determines whether or not the variable j has reached a total number jmax (e.g., 3) of the sensors. In a case where the determination of step 210 is NO, the first display control unit 66 moves to step 212. In step 212, the first display control unit 66 increments the variable j by 1 and returns to step 202. Because of this, steps 202 to 212 are repeated until the determination of step 210 becomes YES, and only information of sensors whose reliability with respect to the sensing information is equal to or higher than the predetermined value is set in the "perception state."

When the determination of step 210 becomes YES, the first display control unit 66 moves to step 214. In step 214, the first display control unit 66 calculates position information representing the three-dimensional position of the preceding vehicle based on the sets of sensing information from the sensors whose information has been set in the "perception state." That is, in a case where there is a set of sensing information whose reliability is less than the predetermined value among the sets of sensing information acquired from the plural sensors (the camera 12, the mmWave radar sensor 14, and the lidar sensor 86), the first display control unit 66 calculates the position information based on sets of sensing information acquired from a sensor group of the plural sensors excluding the sensor corresponding to the set of sensing information whose reliability is less than the predetermined value.

Then, in step 216, the first display control unit 66 sends to the HUD display ECU 38 the position information of the preceding vehicle calculated in step 214 and the "perception state" set in steps 200 and 208. When the first display control unit 66 performs the process of step 216, it returns to step 200 and repeats the processes of step 200 on.

Figure 10:
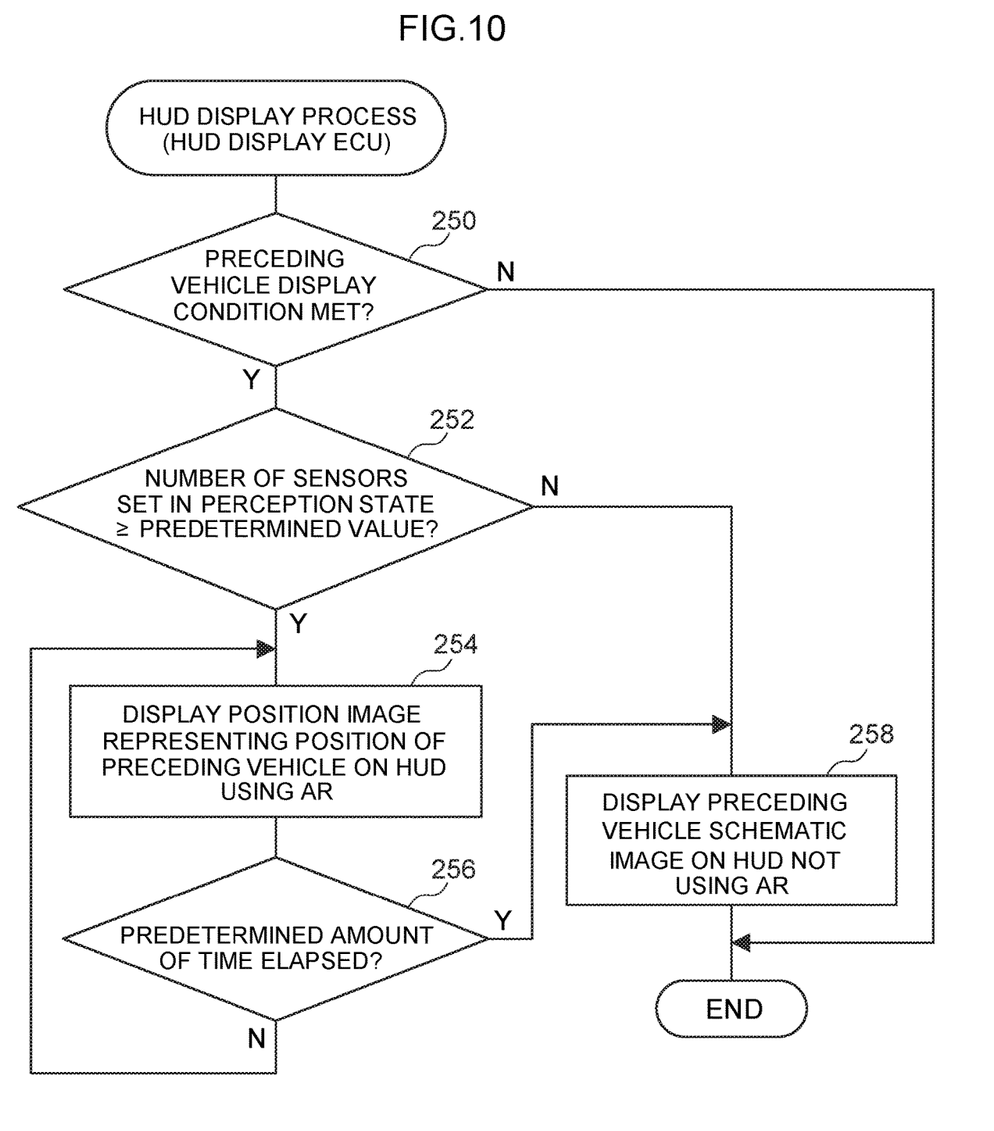
FIG. 10 is a flowchart showing the HUD display process executed by the HUD display ECU in the second embodiment.

Next, the HUD display process executed by the HUD display ECU pertaining to the second embodiment will be described with reference to FIG. 10. In step 250 of the HUD display process, the second display control unit 68 determines, in the same way as in step 150 described in the first embodiment, whether or not the preceding vehicle display condition is met. The second display control unit 68 ends the HUD display process in a case where the determination of step 250 is NO, and moves to step 252 in a case where the determination of step 250 is YES.

In step 252, the second display control unit 68 determines whether or not the number of sensors set in the "perception state" received from the ADAS-ECU 18 is equal to or higher than a predetermined value (e.g., 2). In a case where the determination of step 252 is YES (in a case where the number of sensors set in the "perception state" is equal to or higher than the predetermined value), the position information of the preceding vehicle received from the ADAS-ECU 18 can be judged to have a high calculation accuracy, so the second display control unit 68 moves from step 252 to step 254.

In step 254, the second display control unit 68 computes, in the same way as in step 154 described in the first embodiment from the three-dimensional position information of the preceding vehicle, display position information of the position image 82 for displaying the position image 82 in a position in the first display area HA1 according to the preceding vehicle. Then, the second display control unit 68 outputs the computed display position information, together with the data of the position image 82 to be displayed, to the HUD 56. Because of this, the HUD 56 projects and displays (displays using AR) the position image 82 in a position in the first display area HA1 according to the three-dimensional position information of the preceding vehicle 80.

Furthermore, in a case where the determination of step 252 is NO (in a case where the number of sensors set in the "perception state" is less than the predetermined value), the position information of the preceding vehicle received from the ADAS-ECU 18 can be judged to be lacking in calculation accuracy, so the second display control unit 68 moves from step 252 to step 258. In step 258, the display control unit 68 computes, in the same way as in step 158 described in the first embodiment, two-dimensional display position information for displaying in the second display area HA2 the preceding vehicle schematic image schematically representing the preceding vehicle and outputs the computed display position information, together with the data of the preceding vehicle schematic image 84, to the HUD 56. Because of this, the HUD 56 projects and displays (displays not using AR) the preceding vehicle schematic image 84 in a display position in the second display area HA2.

In a case where the second display control unit 68 displays the position image 82 using AR in step 254, in the next step 256 it determines whether or not a predetermined amount of time (e.g., about several seconds of time) has elapsed since displaying the position image 82 using AR. In a case where the determination of step 256 is NO, the second display control unit 68 returns to step 254 and continues the AR display of the position image 82. In a case where the determination of step 256 is YES, the second display control unit 68 moves to step 258 and, instead of the AR display of the position image 82, moves to the non-AR display of the preceding vehicle schematic image 84.

In this way, in the second embodiment, the first display control unit 66 and the second display control unit 68, in a case where there is a set of sensing information whose reliability is less than a predetermined value among the sets of sensing information acquired from the plural sensors (the camera 12, the mmWave radar sensor 14, and the lidar sensor 86), calculate the position of the preceding vehicle based on sets of sensing information acquired from a sensor group of the plural sensors excluding the sensor corresponding to the set of sensing information whose reliability is less than the predetermined value. Because of this, even in a case where a set of sensing information whose reliability is less than the predetermined value is mixed in among the sets of sensing information acquired from the plural sensors, the position image 82 can be accurately displayed.

Although in the above embodiments an aspect was described where the preceding vehicle was applied as an example of the detection object in the present disclosure, the detection object is not limited to the preceding vehicle; for example, the detection object may also be a pedestrian in front of the vehicle 70.

Furthermore, in the above embodiments, the camera 12, the mmWave radar sensor 14, and the lidar sensor 86 were given as an example of the plural sensors in the present disclosure, but the sensors that detect the detection object in front of the vehicle are not limited to these sensors. Furthermore, the plural sensors may include sensors of an identical type such as, for example, plural cameras 12 with mutually different imaging ranges.

Furthermore, in the above description, an aspect was described where, of the perception state output program 32 and the HUD display program 52 that are an example of the display control program pertaining to the present disclosure, the perception state output program 32 is stored (installed) beforehand in the storage unit 24 and the HUD display program 52 is stored (installed) beforehand in the storage unit 44. However, the display control program pertaining to the present disclosure may also be provided in a form in which it is recorded in a non-transitory recording medium such as an HDD, an SSD, or a DVD.

What is claimed is:

1. A display control device comprising a processor coupled to a memory, the processor executing instructions stored in the memory to perform processes of:
   acquiring a plurality of sets of sensing information from a plurality of sensors on a vehicle that sense objects in front of the vehicle,
   determining a reliability of each of the sets of sensing information acquired from each of the plurality of sensors,
   for the set of sensing information acquired from each of the plurality of sensors, comparing the reliability that has been determined for the set of sensing information with a predetermined value and either (i) including the set of sensing information in a sensing information group when the reliability is greater than or equal to the predetermined value, or (ii) excluding the set of sensing information from being included in the sensing information group when the reliability is less than the predetermined value,
   calculating a position of a detection object in front of the vehicle based on the sets of sensing information included in the sensing information group and without using any of the sets of sensing information that has been excluded from the sensing information group, and
   when displaying a position image representing the position of the detection object so as to overlay the position image on a foreground in a display area in front of a driver's seat, deciding whether or not to display the position image based on the reliabilities of the plurality of sets of the sensing information that have been determined.

2. The display control device of claim 1, wherein the processor acquires environment information relating to a driving environment of the vehicle and, based on the acquired environment information, calculates the reliabilities of the sets of sensing information acquired from the plurality of sensors.

3. The display control device of claim 1, wherein the processor, in a case of not displaying the position image, displays, in a predetermined area, an object image schematically representing the detection object.

4. The display control device of claim 1, wherein:
   the processor includes a first ECU and a second ECU,
   the first ECU acquires the sets of sensing information from the plurality of sensors, determines the reliabilities of the received sets of sensing information, includes or excludes the sets of sensing information in the sensing information group based on the reliability that has been determined for each of the sets of sensing information, and calculates the position of the detection object from the sets of sensing information included in the sensing information group, and
   the second ECU receives the position of the detection object and a number of the sets of sensing information included in the sensing information group from the first ECU and, based on the number of the sets of sensing information included in the sensing information group, decides whether or not to display the position image.

5. The display control device of claim 1, wherein the processor decides whether or not to display the position image based on the number of the sets of sensing information included in the sensing information group.

6. The display control device of claim 5, wherein the processor decides to display the position image when two or more of the sets of sensing information is included in the sensing information group, and decides to not display the position image when less than two of the sets of sensing information is included in the sensing information group.

7. A display control method performed by a processor, the method comprising:
   acquiring a plurality of sets of sensing information from a plurality of sensors on a vehicle that sense objects in front of the vehicle;
   determining a reliability of each of the sets of sensing information acquired from each of the plurality of sensors;
   for the set of sensing information acquired from each of the plurality of sensors, comparing the reliability that has been determined for the set of sensing information with a predetermined value and either (i) including the set of sensing information in a sensing information group when the reliability is greater than or equal to the predetermined value, or (ii) excluding the set of sensing information from being included in the sensing information group when the reliability is less than the predetermined value;
   calculating a position of a detection object in front of the vehicle based on the sets of sensing information included in the sensing information group and without using any of the sets of sensing information that has been excluded from the sensing information group; and
   when displaying a position image representing the position of the detection object so as to overlay the position image on a foreground in a display area in front of a driver's seat, deciding whether or not to display the position image based on the reliabilities of the plurality of sets of the sensing information that have been determined.

8. A non-transitory computer-readable storage medium in which is stored a display control program executable by a processor to perform a process including:
   acquiring a plurality of sets of sensing information from a plurality of sensors on a vehicle that sense objects in front of the vehicle;
   determining a reliability of each of the sets of sensing information acquired from each of the plurality of sensors;
   for the set of sensing information acquired from each of the plurality of sensors, comparing the reliability that has been determined for the set of sensing information with a predetermined value and either (i) including the set of sensing information in a sensing information group when the reliability is greater than or equal to the predetermined value, or (ii) excluding the set of sensing information from being included in the sensing information group when the reliability is less than the predetermined value;
   calculating a position of a detection object in front of the vehicle based on the sets of sensing information included in the sensing information group and without using any of the sets of sensing information that has been excluded from the sensing information group; and,
   when displaying a position image representing the position of the detection object so as to overlay the position image on a foreground in a display area in front of a driver's seat, deciding whether or not to display the position image based on the reliabilities of the plurality of sets of the sensing information that have been determined.

* * * * *